(12) United States Patent
Fukuta et al.

(10) Patent No.: US 10,205,174 B2
(45) Date of Patent: Feb. 12, 2019

(54) ELECTRODE CATALYST INK COMPOSITION

(71) Applicant: SHOWA DENKO K.K., Tokyo (JP)

(72) Inventors: Tatsuya Fukuta, Tokyo (JP); Takashi Sato, Tokyo (JP); Masayuki Yoshimura, Tokyo (JP); Yuji Ito, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 15/106,545

(22) PCT Filed: Aug. 26, 2014

(86) PCT No.: PCT/JP2014/072309
§ 371 (c)(1),
(2) Date: Jun. 20, 2016

(87) PCT Pub. No.: WO2015/098180
PCT Pub. Date: Jul. 2, 2015

(65) Prior Publication Data
US 2017/0033367 A1  Feb. 2, 2017

(30) Foreign Application Priority Data
Dec. 27, 2013  (JP) .................. 2013-272261

(51) Int. Cl.
| | |
|---|---|
| *H01M 4/88* | (2006.01) |
| *H01M 4/90* | (2006.01) |
| *B01D 53/86* | (2006.01) |
| *B01J 35/02* | (2006.01) |
| *H01M 8/1004* | (2016.01) |
| *B01J 23/00* | (2006.01) |
| *H01M 4/04* | (2006.01) |
| *H01M 4/48* | (2010.01) |
| *H01M 8/08* | (2016.01) |
| *B44C 3/02* | (2006.01) |
| *H01M 4/08* | (2006.01) |
| *B44C 1/175* | (2006.01) |

(52) U.S. Cl.
CPC .......... *H01M 4/9016* (2013.01); *B01D 53/86* (2013.01); *B01J 35/02* (2013.01); *H01M 4/8814* (2013.01); *H01M 4/8828* (2013.01); *H01M 4/8882* (2013.01); *H01M 8/1004* (2013.01); *B01D 53/8668* (2013.01); *B44C 1/175* (2013.01); *B44C 3/02* (2013.01); *Y02E 60/52* (2013.01)

(58) Field of Classification Search
CPC ...... B01J 35/02; B01D 53/86; B01D 53/8668; H01M 8/1004; H01M 4/8814; H01M 4/8828; H01M 4/8882; H01M 4/9016; Y02E 60/52; B44C 1/175
USPC ......... 502/100; 429/523, 528; 156/235, 236, 156/247, 249
See application file for complete search history.

(56) References Cited

U.S. PATENT DOCUMENTS

| | | |
|---|---|---|
| 5,415,888 A | 5/1995 | Banerjee et al. |
| 2001/0024748 A1* | 9/2001 | Mizuno ............ B01J 21/18 |
| | | 429/535 |
| 2009/0202885 A1 | 8/2009 | Kim et al. |
| 2010/0196604 A1 | 8/2010 | Kariya et al. |
| 2011/0229793 A1 | 9/2011 | Kurozumi et al. |
| 2012/0183879 A1 | 7/2012 | Okada et al. |
| 2013/0252134 A1 | 9/2013 | Takami et al. |
| 2013/0302715 A1 | 11/2013 | Horikita et al. |

FOREIGN PATENT DOCUMENTS

| | | | |
|---|---|---|---|
| EP | 2216373 A1 | 8/2010 | |
| EP | 2666541 A1 | 11/2013 | |
| JP | 9-501535 A | 2/1997 | |
| JP | 2001-266901 A | 9/2001 | |
| JP | 2004-95553 A | 3/2004 | |
| JP | 2004-311057 A | 11/2004 | |
| JP | 2007-95364 A | 4/2007 | |
| JP | 2009-140927 A | 6/2009 | |
| JP | 2009-224031 A | 10/2009 | |
| JP | 2010-21023 A | 1/2010 | |
| JP | WO 2011040061 A1 * | 4/2011 | .......... H01M 4/8605 |
| JP | 2013-30470 A | 2/2013 | |
| JP | 2013-116458 A | 6/2013 | |
| JP | 2013-191475 A | 9/2013 | |
| WO | 2009/017011 A1 | 2/2009 | |
| WO | 2011/040061 A1 | 4/2011 | |
| WO | 2012/088176 A1 | 6/2012 | |

OTHER PUBLICATIONS

English translation of JP5254975.*
English translation of JP2009140927.*
English translation of JP2009224031.*
English translation of WO2011040061.*
Communication dated May 12, 2017, issued from the European Patent Office in corresponding European Application No. 14874107.7.
Temple C. Patton, "Solubility and Solvent Volatility", Paint Flow and Pigment Dispersion, Interscience Publishers, 1964, Chapter 13, pp. 349 to 385 (39 pgs. total).
International Search Report dated Oct. 28, 2014, issued by the International Bureau in corresponding International Application No. PCT/JP2014/072309.

* cited by examiner

*Primary Examiner* — Sonya M Sengupta
(74) *Attorney, Agent, or Firm* — Sughrue Mion, PLLC

(57) ABSTRACT

An electrode catalyst ink composition which includes metal oxide-based electrode catalyst particles, an electrolyte, and a mixed liquid medium, wherein the mixed liquid medium contains 40 to 85% by mass of water; 5 to 30% by mass of an aqueous solvent (A) that has an evaporation rate of 2.0 or lower when the evaporation rate of water at 25° C. is 1, and a solubility parameter (SP value) of not less than 9; and 10 to 30% by mass of a monoalcohol (B) that has an evaporation rate of higher than 2.0 when the evaporation rate of water at 25° C. is 1, and not more than 3 carbon atoms, provided that the total amount of the mixed liquid medium is 100% by mass.

12 Claims, No Drawings

ELECTRODE CATALYST INK COMPOSITION

CROSS REFERENCE TO RELATED APPLICATIONS

This application is a National Stage of International Application No. PCT/JP2014/072309 filed Aug. 26, 2014, claiming priority based on Japanese Patent Application No. 2013-272261, filed Dec. 27, 2013, the contents of all of which are incorporated herein by reference in their entirety.

TECHNICAL FIELD

The present invention relates to an electrode catalyst ink composition.

BACKGROUND ART

A solid polymer-type fuel cell is a fuel cell in a form where a solid polymer electrolyte is sandwiched between an anode and a cathode and, by supplying a fuel to the anode and oxygen or air to the cathode, oxygen is reduced at the cathode to generate electricity. As the fuel, hydrogen, methanol or the like is mainly used.

On the anode and the cathode, an electrode catalyst layer composed of an electrode catalyst and an electrolyte called "ionomer" is formed. For the formation of such an electrode catalyst layer, conventionally, an electrode catalyst layer-forming ink comprising a volatile solvent such as an alcohol as a dispersion medium is used along with a catalyst and an electrolyte solution. As the electrode catalyst, conventionally a carbon-based catalyst in which noble metal particles are supported on carbon particles is used.

As an electrode catalyst layer-forming ink comprising such a carbon-based electrode catalyst, for example, JP-A-2004-95553 (Patent Literature 1) discloses, as a working example, an ink prepared by stirring and mixing 10 g of a platinum-supported carbon catalyst (Pt: 20 wt %) with 40 g of an electrolyte solution, which is a 5 wt %-NAFION (registered trademark) solution (manufactured by DuPont, solvent: normal propyl alcohol), using a dispersion apparatus.

In addition, JP-A-H9-501535 (Patent Literature 2) discloses, as a working example, an ink prepared from 2.6 mg of NAFION solution (manufactured by DuPont (prepared from 5% by weight of NAFION, 50% by weight of isopropyl alcohol, 25% by weight of methanol and 20% by weight of water)), 390 mg of 1-methoxy-2-propanol, 2 ml of isopropyl alcohol and 487.9 mg of a catalyst (manufactured by Precious Metals Corporation) having 20% platinum on a VULCAN (registered trademark) carbon support.

Meanwhile, in WO2009/017011 (Patent Literature 3) and the like, metal oxide-based electrode catalysts are disclosed as platinum-alternative catalysts. Moreover, in JP-A-2013-30470 and JP-A-2013-116458 (Patent Literatures 4 and 5), catalyst electrodes of a type in which noble metal particles are supported on metal oxide particles are disclosed. In the working examples of these literatures, catalyst inks for cathode are prepared using an aqueous solution obtained by mixing 25 ml of water and 25 ml of propyl alcohol.

CITATION LIST

Patent Literature

Patent Literature 1: JP-A-2004-95553
Patent Literature 2: JP-A-H9-501535
Patent Literature 3: WO2009/017011
Patent Literature 4: JP-A-2013-30470
Patent Literature 5: JP-A-2013-116458

SUMMARY OF INVENTION

Technical Problem

Conventionally, an ink composition containing metal oxide-based electrode catalyst particles may cause cracking when applied and dried on a substrate such as a film to form an electrode catalyst layer.

The present invention was made to solve such a problem, and an object of the present invention is thus to provide an electrode catalyst ink composition which can form an electrode catalyst layer without cracking.

Technical Solution

In order to solve the above-described problem of the conventional art, the present inventors intensively studied and discovered that an ink composition having good dispersion of catalyst particles can be obtained by using an aqueous solution that contains a specific aqueous solvent and alcohol and has a high ratio of water as a dispersion medium in an ink composition in which metal oxide-based electrode catalyst particles and an electrolyte are dispersed; and that, by using this ink composition, an electrode catalyst layer without cracking can be formed, thereby completing the present invention.

The present invention relates to, for example, the following [1] to [14].

[1] An electrode catalyst ink composition, comprising metal oxide-based electrode catalyst particle, an electrolyte, and a mixed liquid medium,
wherein the mixed liquid medium comprises 40 to 85% by mass of water; 5 to 30% by mass of an aqueous solvent (A) that has an evaporation rate of 2.0 or lower when the evaporation rate of water at 25° C. is 1, and a solubility parameter (SP value) of not less than 9; and 10 to 30% by mass of a monoalcohol (B) that has an evaporation rate of higher than 2.0 when the evaporation rate of water at 25° C. is 1, and not more than 3 carbon atoms, provided that the total amount of the mixed liquid medium is 100% by mass.

[2] The electrode catalyst ink composition according to [1], wherein the aqueous solvent (A) is an alcohol which has a solubility parameter (SP value) of not less than 10 and comprises an ether group or an ester group.

[3] The electrode catalyst ink composition according to [1] or [2], wherein the aqueous solvent (A) is at least one selected from the group consisting of glycol monoalkyl ethers and lactic acid esters.

[4] The electrode catalyst ink composition according to [3], wherein the glycol monoalkyl ethers are at least one selected from the group consisting of ethylene glycol monomethyl ether, ethylene glycol monoethyl ether, ethylene glycol monopropyl ether, ethylene glycol mono-n-butyl ether, ethylene glycol mono-tert-butyl ether, propylene glycol monomethyl ether, propylene glycol monoethyl ether, propylene glycol monopropyl ether and 3-methoxy-3-methyl-1-butanol, and the lactic acid esters are at least one selected from the group consisting of methyl lactate and ethyl lactate.

[5] The electrode catalyst ink composition according to any one of [1] to [4], wherein the monoalcohol (B) is at least one selected from the group consisting of methanol, ethanol, n-propanol and isopropanol.

[6] The electrode catalyst ink composition according to any one of [1] to [5], wherein the mixed liquid medium contains 51 to 70% by mass of water.

[7] The electrode catalyst ink composition according to any one of [1] to [6], comprising the metal oxide-based electrode catalyst particle in an amount of 0.5 to 25% by mass, provided that the total amount of the electrode catalyst ink composition is 100% by mass.

[8] The electrode catalyst ink composition according to any one of [1] to [7], wherein the metal oxide-based electrode catalyst particle is a catalyst particle comprising a Group 4 and/or Group 5 metal element (s), carbon, nitrogen and oxygen, or a supported-type catalyst particle in which a noble metal particle is supported on a particle comprising a Group 4 and/or Group 5 metal element(s), carbon, nitrogen and oxygen.

[9] A method of producing an electrode catalyst layer, the method comprising applying the electrode catalyst ink composition according to any one of [1] to [8] on a substrate, and subsequently removing the mixed liquid medium to form an electrode catalyst layer on the substrate.

[10] A method of producing an electrode having an electrode catalyst layer, the method comprising carrying out:

a step (1) of applying the electrode catalyst ink composition according to any one of [1] to [8] on a gas diffusion layer, and subsequently removing the mixed liquid medium, or a step (2) of applying the electrode catalyst ink composition according to any one of [1] to [8] on a transfer substrate, subsequently removing the mixed liquid medium to form an electrode catalyst layer on the transfer substrate, and transferring the electrode catalyst layer onto a gas diffusion layer.

[11] A method of producing an electrolyte membrane for a membrane electrode assembly, which electrolyte membrane has an electrode catalyst layer, the method comprising carrying out:

a step (1) of applying the electrode catalyst ink composition according to any one of [1] to [8] on an electrolyte membrane for a membrane electrode assembly, and subsequently removing the mixed liquid medium, or a step (2) of applying the electrode catalyst ink composition according to any one of [1] to [8] on a transfer substrate, subsequently removing the mixed liquid medium to form an electrode catalyst layer on the transfer substrate, and transferring the electrode catalyst layer onto an electrolyte membrane for a membrane electrode assembly.

[12] A method of producing a membrane electrode assembly, the method comprising carrying out:

a step (1) of forming an electrode catalyst layer on both sides of an electrolyte membrane by use of the electrode catalyst ink composition according to any one of [1] to [8], and joining each of the thus formed two electrode catalyst layers with a gas diffusion layer, or a step (2) of forming electrode catalyst layers on the surfaces of two gas diffusion layers by using the electrode catalyst ink composition according to any one of [1] to [8], and joining the two gas diffusion layers with an electrolyte membrane via the electrode catalyst layers.

[13] The method of producing a membrane electrode assembly according to [12], wherein the step (1) is carried out, the method comprising carrying out a step (a) or a step (b) to form the electrode catalyst layers on both sides of the electrode membrane, the step (a) being a step of applying the electrode catalyst ink composition according to any one of [1] to [8] on the surfaces of the electrolyte membrane, and subsequently removing the mixed liquid medium, the step (b) being a step of applying the electrode catalyst ink composition according to any one of [1] to [8] on a transfer substrate, subsequently removing the mixed liquid medium to form an electrode catalyst layer on the transfer substrate, and transferring the electrode catalyst layer onto the electrolyte membrane.

[14] The method of producing a membrane electrode assembly according to [12], wherein the step (2) is carried out, the method comprising carrying out a step (a) or a step (b) to form the electrode catalyst layers on the surfaces of the gas diffusion layers, the step (a) being a step of applying the electrode catalyst ink composition according to any one of [1] to [8] on the surfaces of the gas diffusion layers, and subsequently removing the mixed liquid medium, the step (b) being a step of applying the electrode catalyst ink composition according to any one of [1] to [8] on a transfer substrate, subsequently removing the mixed liquid medium to form an electrode catalyst layer on the transfer substrate mixed liquid medium, and transferring the electrode catalyst layer onto the gas diffusion layers.

Advantageous Effects of Invention

According to the present invention, an electrode catalyst ink composition which shows good dispersion of metal oxide-based electrode catalyst particles and can form an electrode catalyst layer without cracking is provided.

DESCRIPTION OF EMBODIMENTS

The present invention will now be described in more detail.

The electrode catalyst ink composition according to the present invention is an electrode catalyst ink composition comprising:

a metal oxide-based electrode catalyst particle, an electrolyte, and a mixed liquid medium, wherein the mixed liquid medium comprises 40 to 85% by mass of water; 5 to 30% by mass of an aqueous solvent (A) that has an evaporation rate of 2.0 or lower when the evaporation rate of water at 25° C. is 1, and a solubility parameter (SP value) of not less than 9; and 10 to 30% by mass of a monoalcohol (B) that has an evaporation rate of higher than 2.0 when the evaporation rate of water at 25° C. is 1, and not more than 3 carbon atoms, provided that the total amount of the mixed liquid medium is 100% by mass.

<Metal Oxide-Based Electrode Catalyst Particle>

The metal oxide-based electrode catalyst constituting the electrode catalyst particle may be a metal oxide; may have an oxide structure of the metal element in which an oxygen atom site in the oxide structure is substituted with a carbon atom or a nitrogen atom, or a carbide, nitride or carbonitride structure of the metal element in which a carbon atom or nitrogen atom site is substituted with an oxygen atom; or may be a mixture of compounds having these structures.

Examples of the metal oxide-based electrode catalyst particle includes a catalyst particle comprising a Group 4 and/or Group 5 metal element (s), carbon, nitrogen and oxygen, and a supported-type catalyst particle in which a noble metal particle is supported on a particle comprising a Group 4 and/or Group 5 metal element (s), carbon, nitrogen and oxygen.

As the metal oxide-based electrode catalyst, a conventionally known one can be used, and examples thereof include a metal oxide electrode catalyst disclosed in WO2009/017011 (an electrode catalyst comprising a metal oxide (Y) obtained by heat-treating a metal compound (X) in an oxygen-containing atmosphere, wherein the valence of the metal compound (X) is lower than that of the metal of the metal oxide (Y) and the metal element constituting the metal oxide (Y) is, for example, at least one selected from the group consisting of niobium, titanium, tantalum and zirconium); an electrode catalyst disclosed in JP-A-2013-30470 comprising a transition metal element (at least one selected from titanium, iron, zirconium, copper and niobium), carbon, nitrogen and oxygen as constituent elements, wherein when the molar ratio of the constituent elements is represented as "transition metal element (s):carbon:nitrogen:oxygen=1:x:y:z", x, y and z are each preferably $0.5<x\leq 7$, $0.01<y\leq 2$ and $0.1<z\leq 3$; and an electrode catalyst disclosed in JP-A-2013-116458, in which a catalyst metal (preferably Pt, Au, Ag, Cu, Pd, Rh, Ru, Ir, Os, Re, or an alloy of two or more of these metals) is supported on a heat-treated product comprising a Group 4 or Group 5 transition metal element, carbon, nitrogen and oxygen as constituent elements, wherein when the molar ratio of the constituent elements is represented as "transition metal element:carbon:nitrogen: oxygen=1:x:y:z", x, y and z are each preferably $0<x\leq 7$, $0<y\leq 2$ and $0<z\leq 3$, and wherein the heat treatment product may further contain at least one selected from iron, nickel, chromium, cobalt, vanadium and manganese. An electrode catalyst described in JP-A-2013-30470 and a heat-treated product described in JP-A-2013-116458 can be produced by, for example, a method comprising mixing a transition metal compound (1), which is partially or entirely composed of a transition metal element belonging to the Group 4 or Group 5 of the periodic table, and a nitrogen-containing organic compound (2), wherein, at least one of the compounds (1) and (2) contains an oxygen atom, with a solvent; subsequently removing the solvent; and heat-treating the resulting solid residue at a temperature of 500 to 1,100° C.

The concentration of the metal oxide-based electrode catalyst particles in the ink composition of the present invention may be adjusted as appropriate in accordance with a coating method and the like with the ink composition, and is usually within a range of 0.5% by mass to 25% by mass, provided that the total amount of the ink composition is 100% by mass.

<Electrolyte>

The electrolyte is preferably a polymer electrolyte. Examples thereof include substances which have an acidic group such as a sulfonic acid group or a carboxylic acid group (preferably a sulfonic acid group) and a fluorocarbon-based or hydrocarbon-based polymer main chain (preferably a perfluorocarbon-based polymer), such as NAFION.

In addition, a known substance used in a fuel cell catalyst, for example, a polymer compound doped with an inorganic acid such as phosphoric acid, an organic/inorganic hybrid polymer partially substituted with a proton conductive functional group, or a proton conductor composed of a polymer matrix impregnated with a phosphoric acid solution or a sulfuric acid solution, can be used.

Further, two or more of the above-described substances may be used in combination.

The concentration of the electrolyte in the ink composition of the present invention, particularly in the solid content of the ink, may be adjusted as appropriate in accordance with a coating method and the like with the ink composition, and it is usually within a range of 1.0% by mass to 50% by mass, provided that the weight of the solid content of the ink is 100% by mass.

<Mixed Liquid Medium>

The mixed liquid medium contains 40 to 85% by mass of water, 5 to 30% by mass of the aqueous solvent (A) and 10 to 30% by mass of the monoalcohol (B), provided that the total amount of the mixed liquid medium is 100% by mass.

(Water)

The ratio of water in the mixed liquid medium is 40 to 85% by mass, provided that the total amount of the mixed liquid medium is 100% by mass. From the standpoint of obtaining an ink composition that has good dispersion of the metal oxide-based electrode catalyst particles and the electrolyte and can form a catalyst layer without cracking, the lower limit value of the ratio of water is preferably 51% by mass and the upper limit value is preferably 70% by mass.

When the ratio of water largely exceeds the upper limit value or the lower limit value, the dispersibility of the metal oxide-based electrode catalyst particles in the ink composition is deteriorated. The cause thereof has not been clarified, but is speculated to be the hydrophilicity of the metal oxide-based electrode catalyst particles.

(Aqueous Solvent (A))

The aqueous solvent (A) is a solvent having an evaporation rate of 2.0 or lower when the evaporation rate of water at 25° C. is 1, and a solubility parameter (SP value) of not less than 9. It is noted here that the term "aqueous solvent" used in the present invention refers to a solvent that dissolves in water by not less than 30% by mass.

The evaporation rate of the aqueous solvent (A), provided that the evaporation rate of water at 25° C. is 1, is 2.0 or lower, preferably 0.05 to 1.9, more preferably 0.05 to 0.5.

The solubility parameter (SP value) of the aqueous solvent (A) is not less than 9, preferably not less than 10.

The evaporation rate is a value determined in accordance with ASTM D3539-11 (Standard Test Methods for Evaporation Rates of Volatile Liquids by Shell Thin-Film Evaporometer). The evaporation rate is generally represented by a relative rate taking the evaporation rate of butyl acetate as 1. However, in the present invention, the evaporation rate is represented by a relative numerical value taking the evaporation rate of water at 25° C. as 1. It is noted that the order of the evaporation rates of solvents does not necessarily agree with the order of the boiling points of the solvents.

The solubility parameter (SP value) is a parameter that was proposed by Hildebrand and Scott and defined by the regular solution theory. As methods of measuring and calculating the solubility parameter (SP value), for example, an evaporation latent heat method, a vapor pressure method, a dissolution method, a swelling method, a surface tension method, a critical pressure method, a thermal expansion coefficient method and a molecular attraction constant method are known. In the present invention, the solubility parameter (SP value) is determined based on Small's molecular binding constants shown in Table 13-2 on page 275 of "Paint Flow and Pigment Dispersion" (Japanese-translated edition supervised by Kenji Ueki, published by Kyoritsu Shuppan Co., Ltd.).

Since the mixed liquid medium contains the aqueous solvent (A), the metal oxide-based electrode catalyst particles having higher hydrophilicity than carbon particles and the electrolyte having a hydrophilic group and a hydrophobic group, such as a perfluorocarbon polymer having a sulfonic acid group, can be favorably dispersed in the electrode catalyst ink composition. Because of having good dispersibility, an electrode catalyst layer having smooth surface can be formed by applying the electrode catalyst ink composition.

Examples of the aqueous solvent (A) include:
alkyl monoalcohols such as n-butanol;
glycol monoalkyl ethers such as ethylene glycol monomethyl ether and propylene glycol monomethyl ether;
lactic acid esters such as ethyl lactate;
ketone monoalcohols such as 4-hydroxy-4-methyl-2-pentanone; and
polyhydric alcohols such as ethylene glycol, propylene glycol and glycerin.

The aqueous solvent (A) is preferably an ether group or ester group-containing monoalcohol which has an SP value of not less than 10 and an evaporation rate of 0.05 to 1.9, more preferably an ether group or ester group-containing monoalcohol which has an SP value of not less than 10 and an evaporation rate of 0.05 to 0.5.

Specific examples of more preferred aqueous solvent (A) include glycol monoalkyl ethers such as ethylene glycol monomethyl ether, ethylene glycol monoethyl ether, ethylene glycol monopropyl ether, ethylene glycol mono-n-butyl ether, ethylene glycol mono-tert-butyl ether, propylene glycol monomethyl ether, propylene glycol monoethyl ether, propylene glycol monopropyl ether and 3-methoxy-3-methyl-1-butanol; and lactic acid esters such as methyl lactate and ethyl lactate.

Thereamong, specific examples of still more preferred aqueous solvent (A) include ethylene glycol mono-n-butyl ether, propylene glycol monopropyl ether and 3-methoxy-3-methyl-1-butanol.

As the aqueous solvent (A), a single compound may be used, or two or more compounds may be used. In cases where two or more compounds are used as the aqueous solvent (A), the evaporation rate and the solubility parameter are requirements that should be satisfied by each of the compounds, not by a mixture of the compounds as a whole.

The ratio of the aqueous solvent (A) in the mixed liquid medium is 5 to 30% by mass, provided that the total amount of the mixed liquid medium is 100% by mass. From the standpoint of attaining high compatibility of the mixed liquid medium with the metal oxide-based electrode catalyst particles and the electrolyte, the lower limit value of the ratio of the aqueous solvent (A) is preferably 10% by mass. Meanwhile, from the standpoint of preventing the time required for drying a coating film formed from the ink composition (the evaporation time of the mixed liquid medium) from being markedly long, the upper limit value is preferably 25% by mass.

Further, by adjusting the type and the amount of the aqueous solvent (A) in accordance with the substrate to be coated with the ink composition of the present invention, the compatibility between the ink composition of the present invention and the substrate can be adjusted.

The evaporation rates of the above-described polyhydric alcohols are remarkably slow. Therefore, in cases where any of the polyhydric alcohols is used, it is used in a small amount, for example, in an amount of 5 to 15% by mass with respect to 100% by mass of the ink composition. A polyhydric alcohol may also be used for adjusting the viscosity.

(Monoalcohol (B))

The monoalcohol (B) is a monoalcohol that has an evaporation rate of higher than 2.0 when the evaporation rate of water at 25° C. is 1, and not more than 3 carbon atoms.

As the monoalcohol (B), a single compound may be used, or two or more compounds may be used. In cases where two or more compounds are used as the monoalcohol (B), the evaporation rate is a requirement that should be satisfied by each of the compounds, not by a mixture of the compounds as a whole.

The monoalcohol (B) is used to adjust the time required for drying a coating film formed from the ink composition (the evaporation time of the mixed liquid medium) and to adjust the ink composition to have an appropriate viscosity according to the coating method with the ink composition. Therefore, the monoalcohol (B) is preferably one having a relatively high evaporation rate. Methanol, ethanol, n-propanol and isopropanol are more preferred, and methanol, ethanol and isopropanol are still more preferred.

From the standpoint of preventing the time required for drying a coating film formed from the ink composition (the evaporation time of the mixed liquid medium) from being markedly long, the lower limit value of the ratio of the monoalcohol (B) in the mixed liquid medium, provided that the total amount of the mixed liquid medium is 100% by mass, is 10% by mass. Meanwhile, from the standpoint of obtaining an ink composition that has good dispersion of the metal oxide-based electrode catalyst particles and the electrolyte and can form an electrode catalyst layer without cracking, the upper limit value is preferably 30% by mass, more preferably 25% by mass.

For representative compounds relating to the aqueous solvent (A) or the monoalcohol (B), their boiling points, evaporation rates when the evaporation rate of water at 25° C. is 1, and SP values are summarized in Table 1 below.

TABLE 1

| Solvent | Boiling point (° C.) | Evaporation rate | SP value |
|---|---|---|---|
| methanol | 65 | 5.8 | 14.6 |
| ethanol | 78 | 4.7 | 12.7 |
| isopropyl alcohol | 82 | 4.2 | 11.5 |
| n-propyl alcohol | 97 | 2.5 | 12.0 |
| n-butyl alcohol | 118 | 1.2 | 11.3 |
| ethylene glycol monomethyl ether | 125 | 1.5 | 11.4 |
| ethylene glycol monoethyl ether | 136 | 1.1 | 10.5 |
| ethylene glycol mono-n-butyl ether | 170 | 0.2 | 9.5 |
| propylene glycol monomethyl ether | 120 | 1.9 | 10.4 |
| propylene glycol mono-n-propyl ether | 150 | 0.6 | 9.6 |
| ethyl lactate | 154 | 0.6 | 10.0 |
| propylene glycol | 188 | <0.05 | 12.6 |
| 3-methoxy-3-methyl-1-butanol | 174 | 0.2 | 10.5 |
| butyl acetate | 126 | 2.8 | 8.5 |
| water | 100 | 1.0 | 23.3 |
| glycerin | 290 | <0.05 | 17.2 |

<Ratio of Mixed Liquid Medium>

One example of the criteria for determining the ratios of the aqueous solvent (A), monoalcohol (B) and water contained in the mixed liquid medium is that a condition in which the metal oxide-based electrode catalyst particles are favorably dispersed can be maintained. In order to obtain an ink composition showing good dispersion, the wettability and the size of the electrode catalyst particles, the solubility parameter of the solvent and the like are taken into consideration to determine appropriate ratios of the components constituting the mixed liquid medium.

Another example of the criteria is that the solvent (A), the monoalcohol (B) and water are substantially simultaneously evaporated from the catalyst layer when the electrode catalyst ink composition is dried (no one specific component remains for a prolonged period). By allowing these components to be substantially simultaneously evaporated from the catalyst layer, a catalyst layer without any crack is formed.

The evaporation time of each component contained in the mixed liquid medium can be calculated from the ratio and the evaporation rate of the component. In order to prepare a mixed liquid medium that satisfies the above-described criteria, appropriate ratios of the respective components are estimated such that the components have substantially the same evaporation time. This concept can be a useful key in determining the formulation, though the actual evaporation times in the electrode catalyst ink composition do not necessarily agree with the calculated values because of the effects of azeotrope of solvents and the like.

<Electrode Catalyst Ink Composition>

The electrode catalyst ink composition of the present invention may also contain, as required, an additive(s), for example, a conductive auxiliary agent such as carbon, a dispersant, a thickening agent, a wettability improving agent or an antifoaming agent such as a surfactant in a range where the object of the present invention is not adversely affected.

The electrode catalyst ink composition of the present invention can be produced by mixing the metal oxide-based electrode catalyst particles, the electrolyte, water, the aqueous solvent (A), the monoalcohol (B), and optionally the above-described additive(s).

The order of mixing these components is not particularly restricted. However, when supported-type catalyst particles in which noble metal particles are supported on a carrier are used, it is preferred to first mix water and the catalyst particles because the risk of ignition is thereby reduced.

The mixing time can be determined as appropriate in accordance with, for example, the mixing means, dispersibility of the electrode catalyst particles and the electrolyte, and volatility of the mixed liquid medium.

As the mixing means, a stirring apparatus such as a homogenizer may be employed, or a ball mill, a bead mill, a jet mill, an ultrasonic dispersion apparatus, a kneading and defoaming apparatus or the like may be employed. These means may also be used in combination. Thereamong, a mixing means using an ultrasonic dispersion apparatus, a homogenizer, a ball mill or a kneading and defoaming apparatus is preferred.

Further, if necessary, the mixing can also be performed using a mechanism, an apparatus or the like that maintains the temperature of the ink within a certain range.

<Membrane Electrode Assembly (MEA)>

The method of producing a membrane electrode assembly using the electrode catalyst ink composition of the present invention is not particularly restricted, and is, for example, a method of preparing a MEA, the method comprising applying the electrode catalyst ink composition of the present invention on an electrolyte membrane, drying the applied ink composition (that is, evaporating the mixed liquid medium) and then joining the resultant with a gas diffusion layer (GDL). Such an electrolyte membrane coated with an electrode catalyst ink composition is called "CCM (catalyst coated membrane)". Examples of a method of applying the electrode catalyst ink composition include a method comprising directly applying the electrode catalyst ink composition on an electrolyte membrane, and a method comprising once applying the electrode catalyst ink composition on a transfer substrate and then transferring the applied ink composition.

Another example of the production method is a method of preparing a MEA, the method comprising applying the electrode catalyst ink composition on a gas diffusion layer, drying the applied ink composition (that is, evaporating the mixed liquid medium) and then joining the resultant with a gas diffusion layer (GDL). Such a gas diffusion layer coated with an electrode catalyst ink composition is called "GDE". Examples of a method of applying the electrode catalyst ink composition include a method comprising directly applying the electrode catalyst ink composition on a gas diffusion layer, and a method comprising once applying the electrode catalyst ink composition on a transfer substrate and then transferring the applied ink composition. As the gas diffusion layer, one which has been subjected to a water repellent treatment or one laminated with a MPL can be employed.

Specific examples of the method of applying the electrode catalyst ink composition include a dipping method, a screen printing method, a roll coating method, a spray method, a bar coater method and a doctor blade method.

The method of drying the coated electrode catalyst ink composition of the present invention is not particularly restricted, and is, for example, natural drying or heating with a heater. The drying may be performed at room temperature, under vacuum, or in an inert gas atmosphere. When heating is performed, the drying temperature is preferably 30 to 100° C., more preferably 40 to 100° C., still more preferably 45 to 100° C.

An electrode catalyst layer formed from the electrode catalyst ink composition of the present invention is used as both an anode catalyst layer and a cathode catalyst layer. Since the metal oxide-based electrode catalyst has high oxygen-reducing ability, the electrode catalyst layer is preferably used as a cathode catalyst layer and is useful particularly as a cathode catalyst layer of a membrane electrode assembly arranged in a solid polymer-type fuel cell.

The membrane electrode assembly of the present invention can be obtained by, for example, holding an electrolyte membrane between two electrodes (at least one of them is an electrode which comprises an electrode catalyst layer formed from the electrode catalyst ink composition of the present invention on an electrolyte membrane and/or a gas diffusion layer), with each electrode catalyst layer facing inward, and then pressing the resultant.

The pressing temperature is selected as appropriate in accordance with the components used in the electrolyte membrane and the electrode catalyst layer. From the standpoint of sufficiently joining the electrodes and the electrolyte membrane, the pressing temperature is preferably not lower than 100° C., more preferably not lower than 120° C. and, from the standpoint of inhibiting deterioration of the components contained in the electrolyte membrane and the electrode catalyst layer, the pressing temperature is preferably not higher than 160° C., more preferably not higher than 140° C.

The pressing pressure is selected as appropriate in accordance with the components contained in the electrolyte membrane and the electrode catalyst layer, and the type of the gas diffusion layer. From the standpoint of sufficiently joining the electrodes and the electrolyte membrane, the pressing pressure is preferably not less than 1 MPa, more preferably not less than 2 MPa and, from the standpoint of preventing the porosity of the electrode catalyst layer and that of the gas diffusion layer from being reduced to cause deterioration of the performances of these layers, the pressing pressure is preferably 10 MPa or less, more preferably 6 MPa or less, still more preferably 5 MPa or less.

The pressing time is selected as appropriate in accordance with the pressing temperature and the pressing pressure, and it is preferably 1 to 20 minutes, more preferably 3 to 20 minutes, still more preferably 5 to 20 minutes.

A single solid polymer-type fuel cell can be produced by holding a membrane electrode assembly comprising an electrode catalyst layer formed from the electrode catalyst ink composition of the present invention between sealing materials (gaskets), separators having a gas flow path, and current collector plates, fixing the resultant with a bolt and then tightening the bolt to attain a prescribed surface pressure.

In the solid polymer-type fuel cell of the present invention, a known fuel and oxidizing agent can be used.

On the anode side, any fuel capable of generating protons can be used without restriction.

Examples of such a fuel include hydrogen, alcohols such as methanol, and saccharides such as glycol.

On the cathode side, an oxygen-containing gas can be used as an oxidizing agent, and examples thereof include oxygen and air.

The cathode and the anode may both be operated with the cell temperature being set at 30 to 120° C. while, if necessary, applying thereto a back pressure.

EXAMPLES

The present invention will now be described more concretely by way of examples thereof. However, the present invention is not restricted thereto.

Production Example 1

Production of Catalyst Particles (1):

10.043 g of glycine and 0.5818 g of iron (II) acetate was dissolved in 120 ml of distilled water to prepare liquid (I).

In an ice bath, 10 mL of titanium tetraisopropoxide was slowly added dropwise to 5.118 mL of acetylacetone, and 16 mL of acetic acid was further added thereto to prepare liquid (II).

The liquid (II) was add little by little to the liquid (I) in such a manner that precipitation did not occur. Then, the container of the liquid (II) was washed with 16 ml of acetic acid, and the washing liquid was also added to the liquid (I).

From the clear solution obtained by the above-described operations, the solvent was removed using an evaporator to obtain 14.8 g of solid residue. Then, 1.0 g of this solid residue was heat-treated at 890° C. for 15 minutes in a nitrogen gas atmosphere containing 4% by volume of hydrogen gas (that is, a mixed gas of hydrogen gas:nitrogen gas=4% by volume:96% by volume), thereby obtaining 0.28 g of a solid matter containing Ti, Fe, C, N and O (hereinafter, also referred to as "catalyst particles (1)").

Production of Catalyst Particles (2):

To 100 ml of distilled water, 850 mg of the catalyst (1) was added, and the resultant was shaken for 30 minutes using an ultrasonic washing machine. The temperature of the resulting suspension was maintained at 80° C. with stirring on a hot plate, and 516 mg of sodium carbonate (manufactured by Wako Pure Chemical Industries, Ltd.) was added thereto. Meanwhile, a solution was prepared by dissolving 402 mg of chloroplatinic acid hexahydrate (manufactured by Wako Pure Chemical Industries, Ltd.) (equivalent to 150 mg of platinum) into 50 ml of distilled water. Over a period of 30 minutes, this solution was added to the above-described suspension whose temperature was maintained at 80° C., and the resultant was further stirred for 2 hours with the temperature thereof being maintained at 80° C.

To the thus obtained suspension, 5.0 ml of 37% aqueous formaldehyde solution (manufactured by Wako Pure Chemical Industries, Ltd.) was added over a period of 5 minutes, and the resultant was further stirred for 1 hour with the temperature thereof being maintained at 80° C. The resulting suspension was left to stand so to be cooled to room temperature and subsequently filtered to obtain powder.

The thus obtained powder was heat-treated at 600° C. for 1 hour in a nitrogen gas atmosphere containing 4% by volume of hydrogen gas, thereby obtaining 878 mg of catalyst particles in which platinum is supported on carrier particles containing Ti, Fe, C, N and O (hereinafter, also referred to as "catalyst particles (2)").

Production of Catalyst Particles (3):

In a beaker, 2.60 g (25.94 mmol) of acetylacetone was put and, while stirring the put acetylacetone, 4.80 g (17.59 mmol) of niobium ethoxide was added to prepare a niobium solution.

In another beaker, 60 mL of water, 50 mL of ethanol and 60 mL of acetic acid were put, and 8.74 g (70.36 mmol) of pyrazinecarboxylic acid was added thereto and completely dissolved. While stirring the resulting solution, 10 mL of 5% NAFION-dispersed solution (DE521, manufactured by DuPont) was added thereto, and 290 mg (1.67 mmol) of iron acetate was further added in small portions and dissolved. To the thus obtained solution, with its temperature being maintained at room temperature and under stirring, the niobium solution obtained above was added dropwise over a period of 10 minutes. Thereafter, the resultant was stirred for another 30 minutes to obtain a catalyst precursor solution.

Using a rotary evaporator, under reduced pressure in a nitrogen atmosphere with the temperature of a hot stirrer being set at about 100° C., the catalyst precursor solution was heated with stirring to slowly evaporate the solvent. The solvent was completely evaporated and the resulting solid residue was ground using an automatic mortar to obtain 11.3 g of powder for calcination. While introducing a nitrogen gas containing 4% by volume of hydrogen gas to a rotary kiln furnace at a rate of 20 mL/min, 1.2 g of the thus obtained powder for calcination was heated therein to 890° C. at a heating rate of 10° C./min and calcinated at 890° C. for 0.5 hour. Then, the thus calcinated powder was naturally cooled to obtain 231 mg of powder-form catalyst particles (3).

Example 1

In a 20-ml glass container, 0.5 g of the catalyst (1) and 1.38 g of water were put. Then, 0.58 g of propylene glycol monomethyl ether (ACROS Organics) and 0.35 g of ethanol (Wako Pure Chemical Industries, Ltd.) were added as the aqueous solvent (A) and the monoalcohol (B), respectively.

After further adding 0.5 g of 20% NAFION-dispersed solution (DE2021, manufactured by DuPont; solvent: a mixed solvent containing water, ethanol and n-propanol as main components) as an electrolyte solution, the resultant was mixed for 30 minutes using an ultrasonic dispersion apparatus (UT-106H, manufactured by Sharp Manufacturing Systems Corporation) to prepare an ink composition.

0.5 g of the thus obtained ink composition was dropped on a 100 μm-thick PTFE (polytetrafluoroethylene) sheet (skived tape, manufactured by Chukoh Chemical Industries, Inc.) (substrate). Using K101 control coater (manufactured by RK PrintCoat Instruments Ltd.) and No. 2 bar coater adjusted to have a coating thickness in wet condition of 100 μm, the ink composition was applied (spread) on the PTFE sheet. Subsequently, the thus applied ink composition was dried for 5 minutes in a 100° C. oven to prepare an electrode catalyst layer.

The formulation of the ink composition, the ratio of the catalyst particles and the type of the electrolyte are shown in Table 2.

Examples 2 to 10, Comparative Examples 1 to 7

An ink composition was prepared and an electrode catalyst layer was produced in the same manner as in Example 1, except that the types and the ratios of the aqueous solvent (A), monoalcohol (B) and catalyst particles were changed as shown in Table 2 for Examples 2 to 10 and Table 3 for Comparative Examples 1 to 7. The formulations of the respective ink compositions, the ratios of the catalyst particles and the types of the electrolytes are shown in Table 2 for Examples 2 to 10 and Table 3 for Comparative Examples 1 to 7.

[Evaluations]

The ink compositions prepared in Examples and the like were each subjected to the following evaluations. The evaluation results are shown in Table 2 for Examples 1 to 10 and Table 3 for Comparative Examples 1 to 7.

(Dispersion)

The ink composition was placed in a transparent glass container and subjected to a ultrasonic dispersion treatment for 30 minutes. The resulting electrode catalyst ink composition was left to stand for 5 minutes and then visually observed.

The dispersion of the catalyst particles in each ink composition was evaluated based on the following three-scale criteria.

AA: The catalyst particles were monodispersed.

BB: A difference in the concentration of the catalyst particles was observed between the upper and the lower parts of the ink composition.

CC: Two-layer separation occurred with confirmation of a clear transparent layer.

It is noted here that samples received "CC" in this evaluation were not subjected to the following evaluation because the catalyst particles and the solvent would be separated on a substrate during the coating operation and it was thus evident that a uniform catalyst layer could not be produced.

(Surface Condition of Catalyst Layer)

For evaluation of the surface condition of a catalyst layer, 0.5 g of each electrode catalyst ink composition was dropped on a 100 μm-thick PTFE sheet and, using K101 control coater and No. 2 bar coater adjusted to have a coating thickness in wet condition of 100 μm, the ink composition was applied (spread) on the PTFE sheet by a bar coater method. The resulting catalyst layer was dried at room temperature (25° C.) and the condition thereof was then visually observed.

The surface condition was evaluated based on the following three-scale criteria.

AA: The surface had no cracking or irregularity.

BB: The surface was observed to slightly have a crack(s) and irregularities.

CC: The surface was observed to have many large cracks and the substrate surface was exposed.

TABLE 2

| | Mixed liquid medium | | | | | | | | |
|---|---|---|---|---|---|---|---|---|---|
| | Aqueous solvent (A) | | | Alcohol (B) | | | Total ratio | |
| Example | Substance name | Ratio *1) | Evaporation rate | SP value | Substance name | Ratio *1) | Evaporation rate | of alcohol (B) *1) | Water Ratio |
| 1 | propylene glycol monomethyl ether | 21.4% | 1.9 | 10.4 | ethanol | 13.3% | 4.7 | 21.4% | 57.2% |
| | | | | | n-propanol | 8.1% | 2.5 | | |
| 2 | propylene glycol monomethyl ether | 21.3% | 1.9 | 10.4 | methanol | 15.2% | 5.8 | 23.7% | 55.0% |
| | | | | | n-propanol | 8.1% | 2.5 | | |
| | | | | | ethanol | 0.4% | 4.7 | | |
| 3 | propylene glycol monomethyl ether | 21.3% | 1.9 | 10.4 | n-propanol | 18.3% | 2.5 | 18.7% | 60.0% |
| | | | | | ethanol | 0.4% | 4.7 | | |
| 4 | propylene glycol monomethyl ether | 16.5% | 1.9 | 10.4 | isopropanol | 10.0% | 4.2 | 18.5% | 65.0% |
| | | | | | n-propanol | 8.1% | 2.5 | | |
| | | | | | ethanol | 0.4% | 4.7 | | |
| 5 | ethylene glycol monomethyl ether | 25.0% | 1.5 | 11.4 | ethanol | 11.9% | 4.7 | 20.0% | 55.0% |
| | | | | | n-propanol | 8.1% | 2.5 | | |
| 6 | ethylene glycol mono-n-butyl ether | 10.0% | 0.2 | 9.5 | ethanol | 11.9% | 4.7 | 20.0% | 70.0% |
| | | | | | n-propanol | 8.1% | 2.5 | | |
| 7 | propylene glycol monopropyl ether | 20.0% | 0.6 | 9.6 | ethanol | 11.9% | 4.7 | 20.0% | 60.0% |
| | | | | | n-propanol | 8.1% | 2.5 | | |
| 8 | ethyl lactate | 20.0% | 0.6 | 10.0 | ethanol | 11.9% | 4.7 | 20.0% | 60.0% |
| | | | | | n-propanol | 8.1% | 2.5 | | |
| 9 | 3-methoxy-3-methyl-1-butanol | 12.2% | 0.2 | 10.5 | n-propanol | 22.2% | 2.5 | 22.6% | 65.2% |
| | | | | | ethanol | 0.4% | 4.7 | | |
| 10 | propylene glycol | 5.0% | <0.05 | 12.6 | ethanol | 16.9% | 4.7 | 25.0% | 70.0% |
| | | | | | n-propanol | 8.1% | 2.5 | | |

| | | | | | Evaluation results | |
|---|---|---|---|---|---|---|
| | Catalyst particle | | Electrolyte | | Catalyst layer | |
| Example | Catalyst particle | Ratio *1) | Electrolyte | Ratio *2) | Dispersion | surface condition |
| 1 | (2) | 15% | Nafion | 3% | AA | AA |
| 2 | (1) | 15% | Nafion | 3% | AA | AA |
| 3 | (3) | 15% | Nafion | 3% | AA | AA |
| 4 | (1) | 15% | Nafion | 3% | AA | AA |
| 5 | (1) | 15% | Nafion | 3% | AA | AA |
| 6 | (1) | 15% | Nafion | 3% | AA | AA |

TABLE 2-continued

| | | | | | | |
|---|---|---|---|---|---|---|
| 7 | (1) | 15% | Nafion | 3% | AA | AA |
| 8 | (1) | 15% | Nafion | 3% | AA | AA |
| 9 | (2) | 15% | Nafion | 3% | AA | AA |
| 10 | (1) | 15% | Nafion | 3% | AA | AA |

*1) The ratio when the total amount of the aqueous solvent (A), the alcohol (B) and water is 100% by mass; unit:% by mass
*2) The ratio when the total weight of the electrode catalyst ink composition is 100% by mass; unit:% by mass
Catalyst particles:
(1) catalyst particles containing Ti, Fe, C, N and O
(2) catalyst particles in which platinum is supported on particles containing Ti, Fe, C, N and O
(3) catalyst particles containing Nb, C, N and O

TABLE 3

| | Mixed liquid medium | | | | | | | |
|---|---|---|---|---|---|---|---|---|
| | Aqueous solvent (A) | | | | Alcohol (B) | | Total ratio | |
| Comparative Example | Substance name | Ratio *1) | Evaporation rate | SP value | Substance name | Ratio *1) | Evaporation rate | of alcohol (B) *1) | Water Ratio |
| 1 | propylene glycol monomethyl ether | 36.5% | 1.9 | 10.4 | n-propanol ethanol | 8.1% 0.4% | 2.5 4.7 | 8.5% | 55.0% |
| 2 | | | | | n-propanol ethanol | 71.1% 0.4% | 2.5 4.7 | 71.5% | 28.5% |
| 3 | | | | | ethanol n-propanol | 21.9% 8.1% | 4.7 2.5 | 30.0% | 70.0% |
| 4 | | | | | ethanol n-propanol | 36.9% 8.1% | 4.7 2.5 | 45.0% | 55.0% |
| 5 | butyl lactate | 36.5% | 2.8 | 8.5 | n-propanol ethanol | 8.1% 0.4% | 2.5 4.7 | 8.5% | 55.0% |
| 6 | propylene glycol monomethyl ether n-butanol | 26.3% 7.2% | 33.5% | 1.9 1.2 | 10.4 11.0 | n-propanol ethanol | 8.1% 0.4% | 2.5 2.5 | 8.5% | 58.0% |
| 7 | propylene glycol monomethyl ether | 56.7% | 1.9 | 10.4 | ethanol n-propanol | 13.3% 8.1% | 4.7 2.5 | 21.5% | 21.9% |

| | | | | | Evaluation results | |
|---|---|---|---|---|---|---|
| Comparative | Catalyst particle | | Electrolyte | | | Catalyst layer |
| Example | Catalyst particle | Ratio *1) | Electrolyte | Ratio *2) | Dispersion | surface condition |
| 1 | (2) | 15% | Nafion | 3% | BB | CC |
| 2 | (2) | 15% | Nafion | 3% | CC | not evaluated |
| 3 | (1) | 15% | Nafion | 3% | AA | BB |
| 4 | (1) | 15% | Nafion | 3% | BB | CC |
| 5 | (1) | 15% | Nafion | 3% | CC | not evaluated |
| 6 | (1) | 15% | Nafion | 3% | CC | not evaluated |
| 7 | (1) | 15% | Nafion | 3% | CC | not evaluated |

*1) The ratio when the total amount of the aqueous solvent (A), the alcohol (B) and water is 100% by mass; unit:% by mass
*2) The ratio when the total weight of the electrode catalyst ink composition is 100% by mass; unit:% by mass
Catalyst particles:
(1) catalyst particles containing Ti, Fe, C, N and O
(2) catalyst particles in which platinum is supported on particles containing Ti, Fe, C, N and O In Examples, the ink compositions showed favorable dispersion and catalyst layers having good surface conditions were produced.

In Comparative Examples, some of the catalyst layers had large cracks, and the coating properties of some of the ink compositions could not be evaluated due to poor dispersion of the catalyst particles.

The invention claimed is:

1. An electrode catalyst ink composition, comprising metal oxide-based electrode catalyst particles, an electrolyte, and a mixed liquid medium,
   wherein the mixed liquid medium comprises 40 to 85% by mass of water; 5 to 30% by mass of an aqueous solvent (A) that has an evaporation rate of 2.0 or lower when the evaporation rate of water at 25° C. is 1, and a solubility parameter (SP value) of not less than 9; and 10 to 30% by mass of a monoalcohol (B) that has an evaporation rate of higher than 2.0 when the evaporation rate of water at 25° C. is 1, and not more than 3 carbon atoms, provided that the total amount of the mixed liquid medium is 100% by mass.

2. The electrode catalyst ink composition according to claim 1, wherein the aqueous solvent (A) is a monoalcohol which has a solubility parameter (SP value) of not less than 10 and comprises an ether group or an ester group.

3. The electrode catalyst ink composition according to claim 1, wherein the aqueous solvent (A) is at least one selected from the group consisting of glycol monoalkyl ethers and lactic acid esters.

4. The electrode catalyst ink composition according to claim 3, wherein the glycol monoalkyl ethers are at least one selected from the group consisting of ethylene glycol monomethyl ether, ethylene glycol monoethyl ether, ethylene glycol monopropyl ether, ethylene glycol mono-n-butyl ether, ethylene glycol mono-tert-butyl ether, propylene glycol monomethyl ether, propylene glycol monoethyl ether, propylene glycol monopropyl ether and 3-methoxy-3-methyl-1-butanol, and the lactic acid esters are at least one selected from the group consisting of methyl lactate and ethyl lactate.

5. The electrode catalyst ink composition according to claim 1, wherein the monoalcohol (B) is at least one selected from the group consisting of methanol, ethanol, n-propanol and isopropanol.

6. The electrode catalyst ink composition according to claim 1, wherein the mixed liquid medium contains 51 to 70% by mass of water.

7. The electrode catalyst ink composition according to claim 1, comprising the metal oxide-based electrode catalyst particles in an amount of 0.5 to 25% by mass, provided that the total amount of the electrode catalyst ink composition is 100% by mass.

8. The electrode catalyst ink composition according to claim 1, wherein the metal oxide-based electrode catalyst particles are catalyst particles comprising a Group 4 and/or Group 5 metal element(s), carbon, nitrogen and oxygen, or supported-type catalyst particles in which noble metal particles are supported on particles comprising a Group 4 and/or Group 5 metal element(s), carbon, nitrogen and oxygen.

9. A method of producing an electrode catalyst layer, the method comprising:
   applying the electrode catalyst ink composition according to claim 1 on a substrate, and
   subsequently removing the mixed liquid medium to form an electrode catalyst layer on the substrate.

10. A method of producing an electrode having an electrode catalyst layer, the method comprising:
   a step (1) of applying the electrode catalyst ink composition according to claim 1 on a gas diffusion layer, and subsequently removing the mixed liquid medium, or
   a step (2) of applying the electrode catalyst ink composition according to claim 1 on a transfer substrate, subsequently removing the mixed liquid medium to form an electrode catalyst layer on the transfer substrate, and transferring the electrode catalyst layer onto a gas diffusion layer.

11. A method of producing an electrolyte membrane for a membrane electrode assembly, which electrolyte membrane has an electrode catalyst layer, the method comprising:
   a step (1) of applying the electrode catalyst ink composition according to claim 1 on an electrolyte membrane for a membrane electrode assembly, and subsequently removing the mixed liquid medium, or
   a step (2) of applying the electrode catalyst ink composition according to claim 1 on a transfer substrate, subsequently removing the mixed liquid medium to form an electrode catalyst layer on the transfer substrate, and transferring the electrode catalyst layer onto an electrolyte membrane for a membrane electrode assembly.

12. A method of producing a membrane electrode assembly, the method comprising:
   a step (1) of forming an electrode catalyst layer on both sides of an electrolyte membrane by use of the electrode catalyst ink composition according to claim 1, and joining each of the thus formed two electrode catalyst layers with a gas diffusion layer, or
   a step (2) of forming electrode catalyst layers on the surfaces of two gas diffusion layers by using the electrode catalyst ink composition according to claim 1;
and joining the two gas diffusion layers with an electrolyte membrane via the electrode catalyst layers.

* * * * *